April 6, 1965  R. O. CASE, JR., ETAL  3,177,484
POSITION INDICATING SYSTEM
Filed March 29, 1961  5 Sheets-Sheet 2

INVENTORS
ROBERT O. CASE JR.
RULON G. SHELLEY
BY JEROME M. PAGE

ATTORNEY

INVENTORS
ROBERT O. CASE JR.
RULON G. SHELLEY
BY JEROME M. PAGE

*Edward A. Sokolski*
ATTORNEY

April 6, 1965 R. O. CASE, JR., ETAL 3,177,484
POSITION INDICATING SYSTEM
Filed March 29, 1961 5 Sheets-Sheet 4

INVENTORS
ROBERT O. CASE JR.
RULON G. SHELLEY
BY JEROME M. PAGE

*Edward A. Sokolski*
ATTORNEY

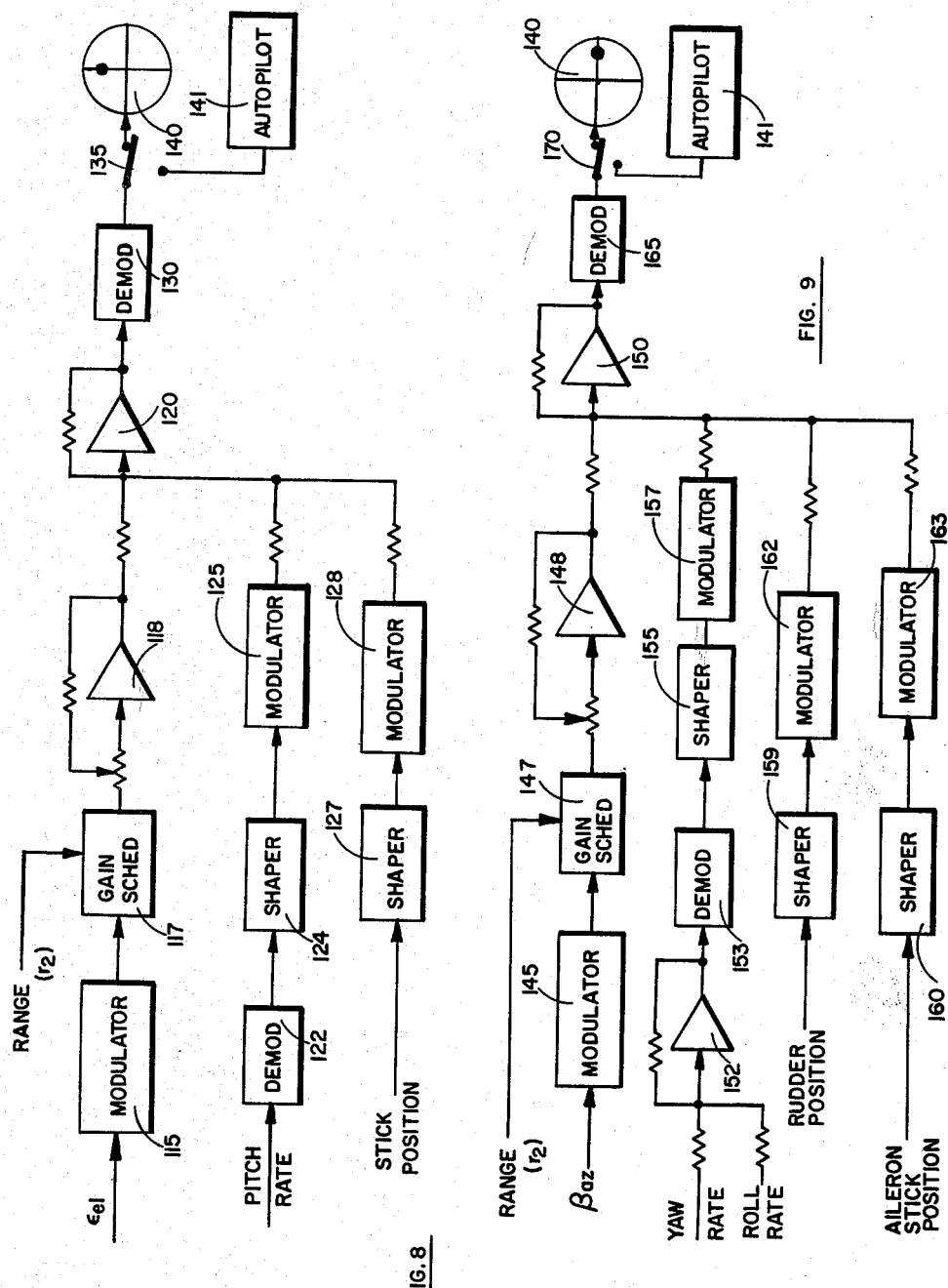

United States Patent Office 3,177,484
Patented Apr. 6, 1965

3,177,484
POSITION INDICATING SYSTEM
Robert O. Case, Jr., La Habra, and Rulon G. Shelley and Jerome M. Page, Downey, Calif., assignors to North American Aviation, Inc.
Filed Mar. 29, 1961, Ser. No. 99,310
12 Claims. (Cl. 343—7)

This invention relates to a vehicle position indicating system and more particularly to such a system which utilizes simulated targets having preselected positions in conjunction with means mounted in the vehicle for detecting the angle subtended between these targets and the range to at least one of these targets.

While the device of this invention may be used to control the position of any type of vehicle relative to a pair of simulated targets, for illustrative purposes, an operative embodiment for controlling the landing of an aircraft is described herein.

A landing system which will enable a safe landing under all-weather conditions is much in demand for both commercial and military applications. In effecting a landing, first, the airfield must be located, then guidance must be accomplished during an approach phase and finally the aircraft must be guided during flareout to touchdown. Once the runway is located, an approach phase of guidance is required both in azimuth (i.e., the aircraft must approach along the line of the runway) and in elevation, where the correct altitude is maintained as a function of distance from the runway. At some appropriate terminal point of the approach (depending on aircraft characteristics), a flareout is initiated to result in touchdown within prescribed distances and at an appropriate rate of descent.

There are many systems now in use for the solution of the identification and approach problems such as, for example, instrument landing systems and ground control approach systems which enable the identification and approach of airfields in adequate fashion. There are also many systems under development for enabling terminal control of the aircraft to touchdown after the approach systems have performed their function.

In general, however, approach systems now in use require very complex ground based equipment and communication receivers in the aircraft adapted to work in conjunction with such ground based equipment. Such apparatus is not readily integrated with other aircraft electronics requirements, thereby necessitating an increase in the quantity and complexity of the equipment needed. Any airborne tracking radar can be provided with a beacon track mode to derive most of the information required for the landing problem but must rely on either information derived from ground-based electronics equipment or additional airborne sensing elements for augmentation of the basic radar range and angle data.

The primary advantage of the device of the invention is that nearly all of the required information for identification, approach, and flareout-to-touchdown can be derived from the radar system installed in the aircraft with only minimum requirements on external sensors and communication equipment. In addition, information is available to guide the aircraft down the runway either after touchdown or on takeoff under conditions of poor visibility. The landing capability can be attained with only a slight increase in the complexity of an aircraft radar system used for other requirements such as armament control, air-to-air search and track, navigation, terrain obstacle avoidance, and ground mapping.

The device of the invention accomplishes the desired end result by utilizing a pair of simulated targets positioned on the landing runway which are tracked by a tracking radar installed in the aircraft. The tracking radar may, for example, comprise a monopulse radar system capable of deriving the azimuth angle off the radar antenna boresight of the simulated targets, the elevation angle subtended at the aircraft between these targets, and the range to one of the targets. This information is processed to derive an error signal, and this error signal is then used in a control device to fly the aircraft to touchdown.

It is therefore an object of this invention to provide an improved system for controlling a vehicle relative to a pair of simulated targets.

It is another object of this invention to simplify all weather landing systems without sacrificing precision operation.

It is a further object of this invention to provide an all weather landing system which utilizes an airborne tracking radar and simulated radar targets on the ground to derive the information necessary to effect a landing.

It is still a further object of this invention to provide a landing system with identification and approach capabilities as well as terminal control capabilities which utilizes a minimum amount of ground based equipment.

It is still a further object of this invention to facilitate the landing operations of identification, approach, and flareout-to-touchdown during all weather conditions.

Other objects of this invention will become apparent from the following description taken in connection with the accompanying drawings in which FIG. 1 is an illustration indicating the general features of the device of the invention;

FIG. 8 is a block diagram showing the details of the elevation channel of a landing coupler which may be utilized in the embodiment of FIG. 6; and FIG. 9 is a block diagram illustrating the details of the azimuth channel of a landing coupler which may be utilized in the embodiment of FIG. 6.

Figure 1:
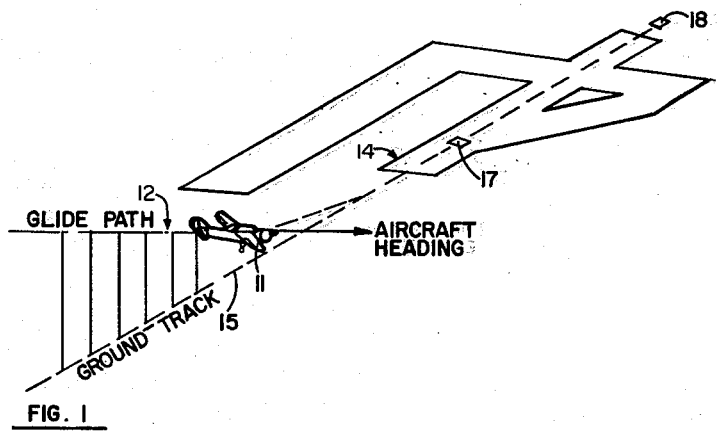

Referring now to FIG. 1, the general features of the device of the invention are illustrated. A pair of beacons 17 and 18 are mounted on runway 14 in a line along the landing strip corresponding to the desired aircraft ground track 15. To effect a proper landing, aircraft 11 should be maintained along glide path 12 with a ground track 15. The tracking radar in aircraft 11 is caused to lock-on to the further beacon 18 in both range and angle so as to automatically track this beacon. The boresight of the radar antenna being locked-on to target 18, the target echoes from target 17 will cause signals to be generated in the radar indicative of the deviation of this target from the antenna boresight in both elevation and azimuth. These azimuth and elevation error signals generated by virtue of simulated target 17 are indicative of the angles subtended between targets 18 and 17 in both the azimuth and elevation planes of the antenna system.

Figure 2:
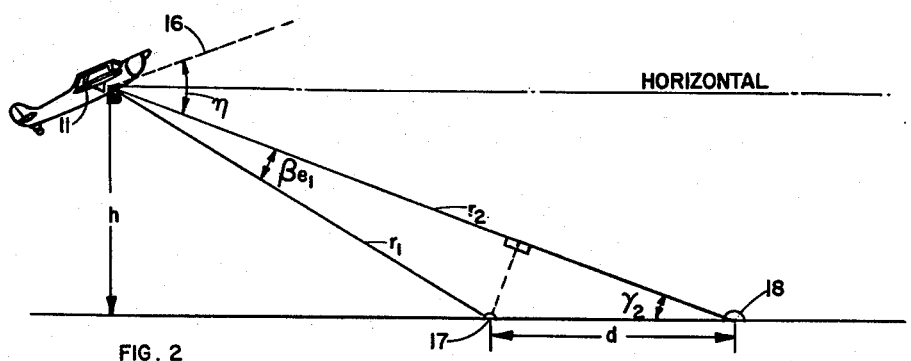
FIG. 2 is a diagram illustrating the elevation plane landing geometry of the device of the invention.

Referring now to FIG. 2, the elevation plane landing geometry of the device of the invention is illustrated. The radar antenna (not shown) mounted in the aircraft is locked-on to simulated target 18 mounted on the runway, thereby establishing the slant range $r_2$ to this simulated target and pointing the boresight axis of the antenna in the direction of simulated target 18 with the radar antenna depressed relative to the aircraft reference line by an angle $\eta$. The angle of beacon 17 (mounted on the runway) from the boresight axis of the antenna is derived by the tracking radar. This angle $\beta_{el}$ may be derived in a monopulse radar system in the monopulse elevation error channel. The aircraft altitude $h$, as can be seen from FIG. 2, is as follows:

$$h = r_2 \sin \gamma_2 \quad (1)$$

By applying the law of sines, it can be readily seen that the angle $\gamma_2$ is equated as follows:

$$\sin \gamma_2 = \frac{r_1 \sin \beta_{el}}{d} \quad (2)$$

$r_1$ is related to $r_2$ as follows for shallow approach angles which will result in small values of $\beta_{el}$:

$$r_1 \cong r_2 - d \cos \gamma_2 \quad (3)$$

For shallow approach angles, the aircraft altitude, $h$, upon substitution of Equations 2 and 3 into Equation 1 is as follows:

$$h \cong \frac{r_2 (r_2 - d) \beta_{el}}{d} \quad (4)$$

The relationship of Equation 4 is applicable for computation of the lateral displacement of the aircraft off the runway where the azimuth error signal $\beta_{az}$ replaces the elevation error signal. The lateral displacement, $y$, of the aircraft is given as follows:

$$y \cong \frac{r_2 (r_2 - d) \beta_{az}}{d} \quad (5)$$

The outputs $\beta_{el}$ and $\beta_{az}$ are derived from the tracking radar. A monopulse tracking radar, such as that described in Patent No. 2,933,980, filed August 3, 1953, J. R. Moore et al. inventors, entitled "Integrated Aircraft and Fire Control Autopilot," may be used to generate the azimuth and elevation error signals.

The altitude, $h$, and lateral displacement, $y$, are not used directly in the guidance equations since computation can be simplified with improved stability of steering by using other signals related thereto. In azimuth, the signals indicative of the angle $\beta_{az}$ are directly used for steering since when these signals are nulled the lateral displacement from the runway is zero and a proper heading is established for the landing.

Figure 3:
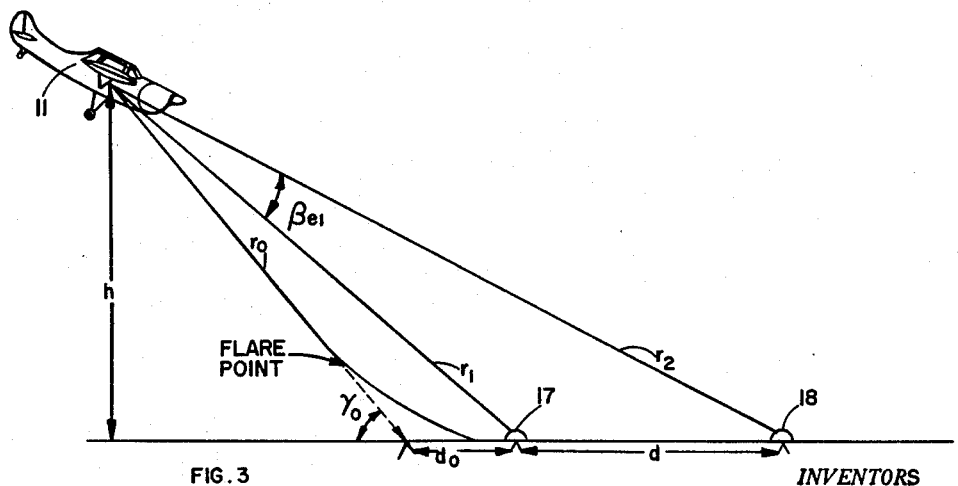
FIG. 3 is a diagram illustrating the glide slope and flare relationships in the device of the invention.

Referring now to FIG. 3, the derivaion of elevation guidance signals during the glide slope and flare-out phases is illustrated. The desired glide slope angle $\gamma_0$ is a function of the aircraft characteristics. The functional programming of $\beta_{el}$, which will result in the desired glide slope with a virtual touchdown point at a desired distance $d_0$ from the first beacon, is derived as follows:

$$\sin \gamma_0 = \frac{h}{r_0} \quad (6)$$

For shallow approach angles, the range $r_0$ is given approximately as follows:

$$r_0 \cong r_2 - (d + d_0) \quad (7)$$

Substituting Equations 4 and 7 in Equation 6, the desired angle $\gamma_0$ is as follows:

$$\gamma_0 \cong \frac{r_2 (r_2 - d) \beta_{el}}{d (r_2 - d - d_0)} \quad (8)$$

The desired value of $\beta_{el}$ which will result in the desired glide slope angle, $\gamma_0$ is then determined by solving Equation 8 as follows:

$$\beta_{el} = \frac{d (r_2 - d - d_0) \gamma_0}{r_2 (r_2 - d)} \quad (9)$$

By a similar derivation, it can be shown that the flare can be programmed as a function of $r_2$ so that, in general, the entire glide slope and flare can be programmed as a function of range, i.e., $\beta_{el} = f(r_2)$, for any given aircraft.

The elevation steering error, $\epsilon$, then can be expressed as follows:

$$\epsilon = f(r_2) - \beta_{el} \quad (10)$$

The device of this invention may be incorporated with landing systems which do not use a programmed path such as, for example, the system described in copending application Serial No. 35,306, assigned to North American Aviation, Inc., entitled "Terminal Prediction Aircraft Landing System," E. R. Buxton inventor, filed June 10, 1960 (now U.S. Patent No. 3,059,880). The altitude and altitude rate information required in such a system can readily be derived from the range and $\beta_{el}$ outputs of the radar. In such a system, of course, $\beta_{el}$ is not programmed as a function of range.

As to be shown further on in the specification, the guidance equations must be augmented by certain gain scheduling as a function of range and by stabilization signals introduced in a landing coupler. The degree of complexity of this coupler is a function of the aircraft dynamic characteristics and the nature of the touchdown phase of the landing.

Figure 4:
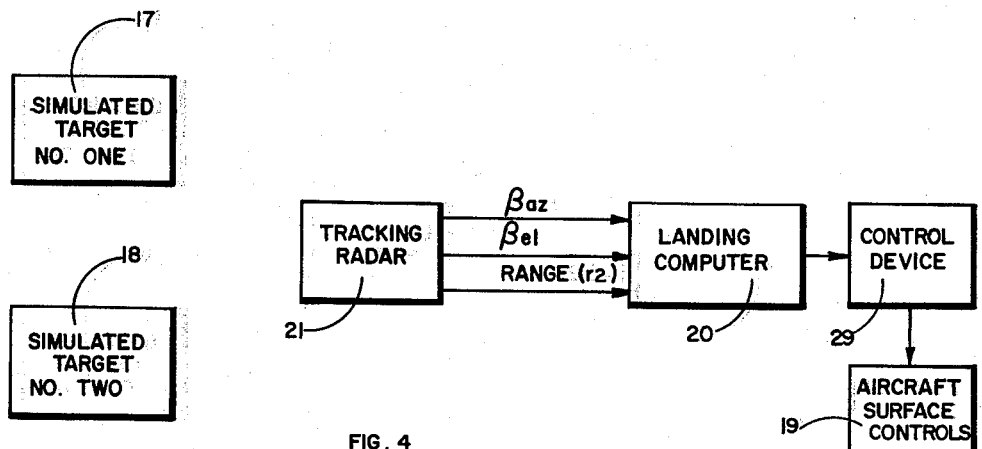
FIG. 4 is a block diagram illustrating the basic structure of the device of the invention.

Referring now to FIG. 4, the general features of the device of the invention are illustrated. The first and second simulated targets 17 and 18 are positioned on the runway at predetermined locations, preferably in a line along the landing strip. These simulated targets may comprise beacons which, when keyed by the radar signals, will generate response signals. The frequency of transmission of the beacons, to which the radar receiver is tuned, may be different from the radar transmitting frequency so that only the beacon signals and no radar echoes will be received during the landing operation. Other simulated targets such as reflectors or modulated reflectors may also be used. The two simulated targets should be separated by a sufficient distance to enable the generation of adequately separated range gates corresponding to each of the beacons and to provide a sufficient elevation separation angle. Distances in the neighborhood of 6,000 feet should be adequate in most instances.

The tracking radar 21, which is mounted in the aircraft, should be locked-on to one of the simulated targets, preferably the furthest target 18. Tracking radar 21 when locked-on to simulated target 18 will have an output due to the signals received from simulated target 17 in accordance with the deviation in azimuth and elevation of simulated target 17 from the boresight of the antenna of the tracking radar 21 which is alined with simulated target 18. The signal representing this deviation in azimuth, $\beta_{az}$, and in elevation, $\beta_{el}$, of simulated target 17 from the radar boresight are fed to landing computer 20.

Tracking radar 21, when locked-on to target 18, will also have a range output $r_2$ in accordance with the range of simulated target 18 therefrom. This range signal $r_2$ is fed to landing computer 20.

Landing computer 20, which receives the $\beta_{az}$ and $\beta_{el}$ signals as well as the signals indicative of the range to simulated target 18, utilizes these signals and, in addition, augmentation signals, to be described further on in the specification, to generate azimuth and elevation control signals which are fed to control device 29. The output of control device 29 is used to control the aircraft surface controls 19. Control device 29 may be an appropriate indicator device by means of which the pilot may fly the aircraft to zero out the error signals or it may comprise an autopilot which will automatically fly the aircraft so as to null these error signals.

Figure 5:
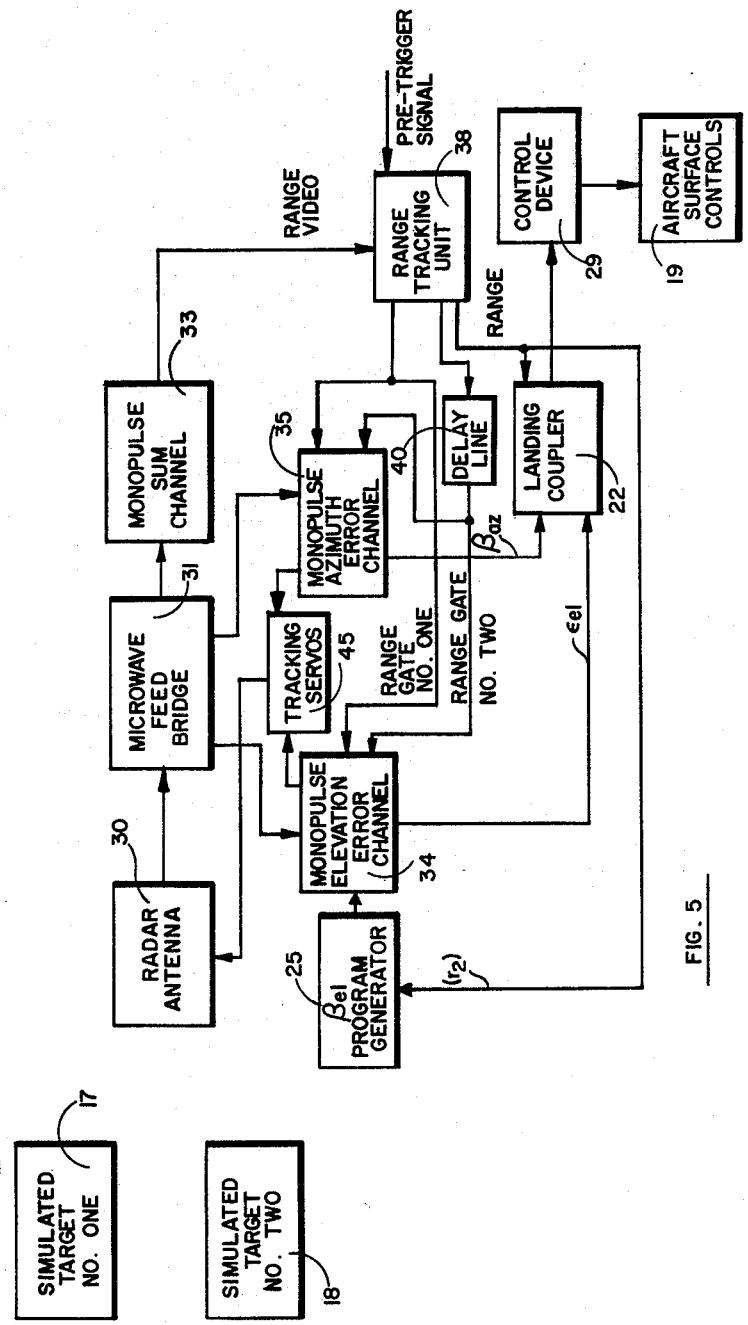
FIG. 5 is a block diagram illustrating a preferred embodiment of the device of the invention.

Referring now to FIG. 5, a block diagram of a preferred embodiment of the device of the invention is illustrated. This embodiment utilizes a monopulse radar receiver as described in aforementioned Patent No. 2,933,980. The radar antenna 30 of the monopulse radar is locked-on in azimuth and elevation to simulated target 18. The signals received by radar antenna 30 are processed in a microwave feed bridge 31 by techniques described in the aforementioned Patent No. 2,933,980 and separated into sum, elevation error, and azimuth error signals. These signals are fed respectively to the monopulse sum channel 33, the monopulse elevation error channel 34, and the monopulse azimuth error channel 35.

The output of monopulse sum channel 33 is a video signal, the time of appearance of which after the transmitted pulse is indicative of the range to simulated target 18. This range video signal is fed to the range tracking unit 38. Range tracking unit 38, by means to be explained with reference to FIGS. 6 and 7, generates a D.-C. signal in accordance with the range of target 18 and also generates a range gate signal in accordance with the range of simulated target 17. A range gate signal corresponding to the range of simulated target 18 is generated by passing the range gate signal indicative of the range of target 17 through delay line 40. The range gate signals for both simulated targets are fed to both the monopulse elevation error channel 34 and the monopulse azimuth error channel 35. These range gate signals are used to synchronize associated box car detectors and gain control circuits if required as will be described in connection with FIG. 6.

$\beta_{el}$ program generator 25 generates an output signal in accordance with the desired $\beta_{el}$ as a function of the range $r_2$ to simulated target 18. A signal in accordance with the range $r_2$ to target 18 is fed to program generator 25 from range tracking unit 38. This signal in accordance with desired $\beta_{el}$ is fed to the monopulse elevation error channel 34 where the actual $B_{el}$ signal is subtracted therefrom and a resultant elevation error signal $\epsilon_{el}$ developed. The elevation error signal $\epsilon_{el}$ is fed from the elevation error channel 34 to landing coupler 22. The details of landing coupler 22 will be explained further on in the specification with reference to FIGS. 8 and 9.

As indicated in Equation 9, the desired glide slope angle, $\gamma_0$, can be directly related to the angle $\beta_{el}$. Program generator 25 should be designed in accordance with the particular characteristics of the aircraft in which it is utilized. In view of the information available as to the exact distance between simulated targets 17 and 18, it can readily be seen that the angle subtended by these targets at the aircraft provides sufficient information to program the glide slope as a function of the range to one of the targets. Program generator 25 may be any conventional function generator which operates in response to an input signal such as, for example, one of those described in "Electronic Analog Computers," by Korn & Korn, published by McGraw-Hill Book Company, 1956, chapter 6, pages 251 et seq.

Signals indicative of any deviation in azimuth and elevation of the boresight of the radar antenna from simulated target 18 are fed respectively from the monopulse azimuth error channel 35 and the monopulse elevation error channel 34 to tracking servos 45. In the tracking servos 45, control signals are generated for maintaining the boresight of the antenna alined with or locked-on to simulated target 18. These signals are fed so as to control radar antenna 30 to maintain azimuth and elevation lock-on. This is accomplished by techniques well known in the art.

Figure 6:
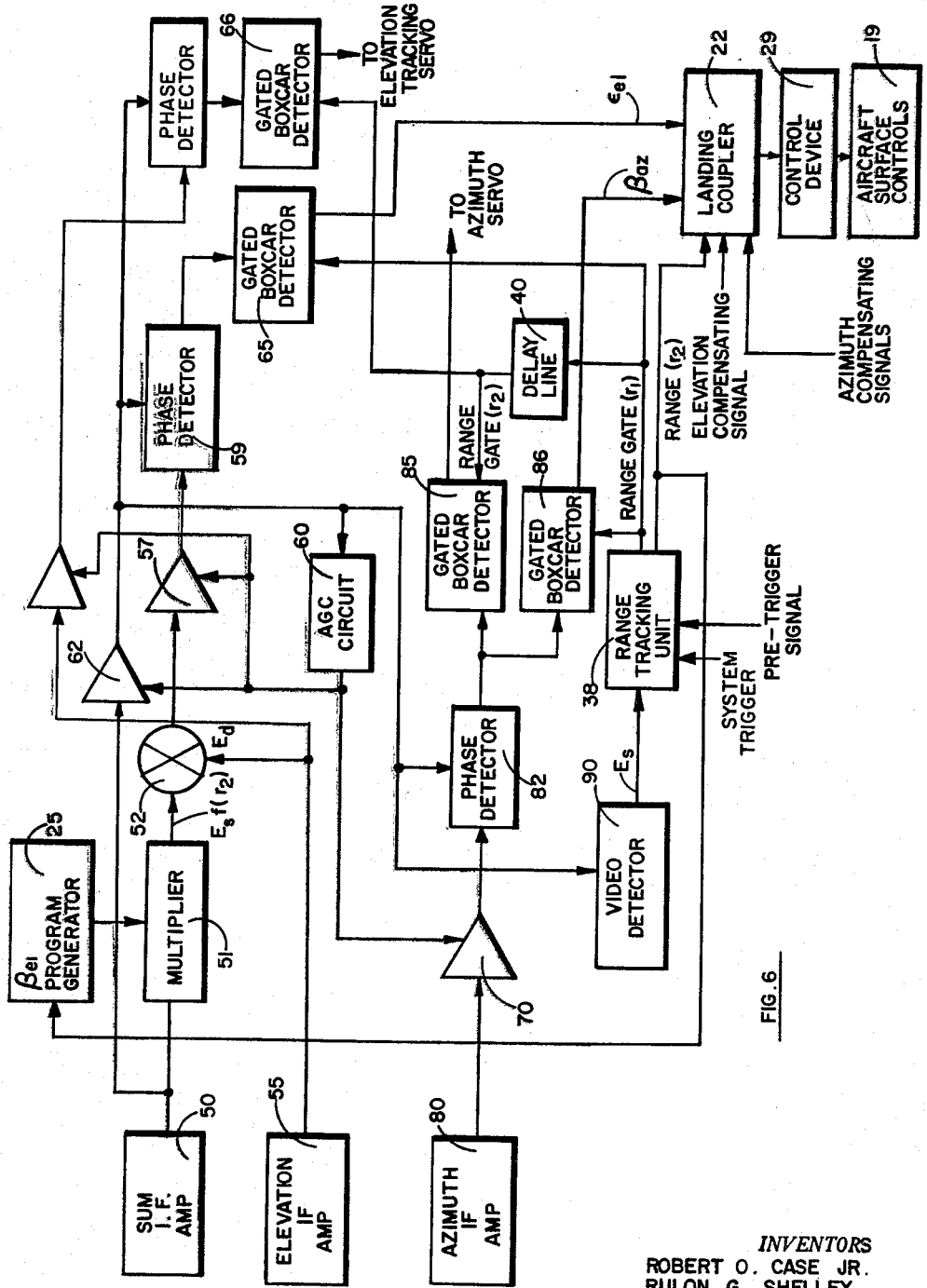
FIG. 6 is a block diagram showing the embodiment of FIG. 5 in detail.

Referring now to FIG. 6, the details of one possible mechanization of the embodiment illustrated in FIG. 5 are shown. The output of the sum channel 33 at IF amplifier 50 is fed to multiplier 51 where it is multiplied with the output of the $\beta_{el}$ program generator 25. The output of multiplier 51 is fed to summing device 52 where the output of elevation error channel 34 at the elevation IF amplifier 55 is subtracted therefrom. The output of summing device 52 is fed to amplifier 57 where it is appropriately amplified and fed to phase detector 59.

It is to be noted that instantaneous AGC signals generated in the AGC circuit 60, which is responsive to the output of the sum IF amplifier 50 as amplified by amplifier 62, are fed to control the gain of amplifiers 57, 62, and 70 to prevent variations in the output signal with sum signal amplitude variations. This in effect provides a division by $E_s$ which is necessary to the generation of the elevation error signal $\beta_{el}$ which is equal to $E_d/E_s$, $E_d$ being the output of the elevation IF channel. The receiver gain control can be gated by deriving timing pulses at $r_1$ and $r_2$ and thereby use the slow AGC mechanization if desired. In this case the multiplier is not used.

Phase detector 59 has as its reference signal the output of sum IF amplifier 50 as amplified by amplifier 62. The output of phase detector 59 is a video signal in accordance with all elevation error signals. This includes $F(r_2) - \beta_{el}$ which is equal to $\epsilon_{el}$ the elevation error signal which must be corrected for to make for correspondence between the desired $\beta_{el}$ and the actual measured $\beta_{el}$. A phase detector circuit which may be utilized to perform the functions of phase detectors 59 and 82 is described in detail in the aforementioned Patent No. 2,933,980 to J. R. Moore et al.

The output of phase detector 59 is fed to gated box car detector 65. Also provided is a second gated box car detector 66 in cooperation with the antenna elevation tracking loop, to be more fully described hereinafter. Box car detectors 65 and 66 are synchronized detectors gated to feed video signals to a storage element only when the gating signal is present. The box car detectors enable synchronous detection of the desired signals alone eliminating other signals from the output. Suitable box car detectors which may be used for this purpose are described in the MIT Radiation Laboratory Series, volume 24, entitled "Threshold Signals," by Lawson and Uhlenbeck on pages 257 et seq.

Gated box car detector 65 is synchronized with range gate $r_1$ appearing at a time corresponding to the range of simulated target 17 (the closer target on which the radar antenna is not locked). This box car detector, therefore, will be synchronized with signals indicative of the arrival of the video error signals from target 17. The output of gated box car detector 65 which is $f(r_2) - \beta_{el}$ or $\epsilon_{el}$ is fed to landing coupler 22.

Gated box car detector 66 is synchronized with range gate $r_2$ appearing at a time corresponding to the range of the simulated target 18 onto which the radar is locked. The input to box car detector 66 includes the elevation error signal generated by virtue of target 18. The output of this gated box car detector will therefore represent elevation control signals necessary to keep the radar antenna locked onto simulated target 18. These signals are fed to the elevation tracking servo (not shown) which controls the radar antenna.

The output of the azimuth IF amplifier 80 is fed to amplifier 70 where it is amplified and then on to phase detector 82 where it is phase detected with reference to the output of the sum IF amplifier 50 as amplified by amplifier 62. The output of phase detector 82 is a video signal indicative of the deviation in azimuth of simulated targets 17 and 18 from the boresight of the radar antenna. The output of phase detector 82 is effectively separated into the separate azimuth error signals generated by virtue of targets 18 and 17 in gated box car detectors 85 and 86, respectively. Box car detector 85 is synchronized with range gate $r_2$ while box car detector 86 is synchronized with range gate $r_1$ which appear at times corresponding respectively to the ranges of simulated targets 18 and 17.

The output of gated box car detector 85 is a signal indicative of any deviation in azimuth of simulated target 18 from the boresight of the radar antenna. This signal is fed to the azimuth tracking servo where it is utilized to keep the boresight of the antenna aligned with simulated target 18. The output of gated box car detector 86 is indicative of any deviation in azimuth of simulated target 17 from the antenna boresight. This signal which represents the azimuth error signal $\beta_{az}$ is fed to landing coupler 22 where it is utilized to generate the azimuth control signals.

Figure 7:
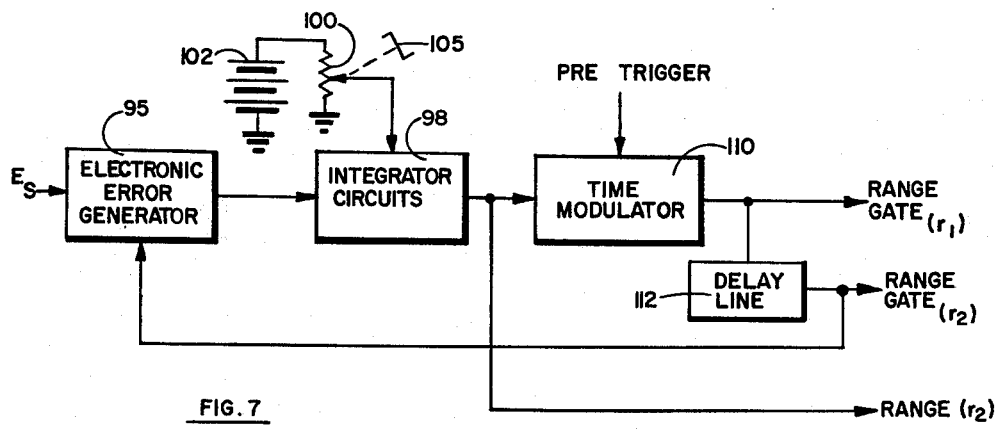
FIG. 7 is a block diagram illustrating the details of a range tracking unit which may be utilized in the embodiment of FIG. 6.

The output of amplifier 62, which is the sum channel IF signal, is fed to video detector 90 where it is video detected and then fed on to range tracking unit 38. Range tracking unit 38 receives as its inputs a system trigger, a pretrigger signal, and the video signal $E_s$ from video detector 90. The range tracking unit generates as its outputs a range gate, $r_1$, indicative of the range to simulated target 17 and a D.-C. range signal indicative of the range to simulated target 18. A range tracking unit such as that described in North American Aviation's co-pending application Serial No. 703,796, entitled "Range Tracking Computer System," G. J. Himler et al. inventors, filed December 1957 (now U.S. Patent No. 3,078,457), or that described in Patent No. 2,836,810, issued May 27, 1958, MacNichol et al. inventors, may be utilized. The general mode of operation of the range tracking computer circuitry is illustrated in FIG. 7 and will be explained further on in the specification.

The pretrigger signal fed to the range tracking unit 38 is generated at a time preceding the system trigger in accordance with the distance between simulated targets 17 and 18. This time interval corresponds to the difference in the time it takes for a radio wave to make a round trip between the radar and targets 17 and 18. The pretrigger signal may be generated as the output of a pulse generator circuit with the system trigger being developed from this pretrigger signal by delaying the pretrigger signal the desired amount by means of a conventional delay line.

The output of range tracking unit 38 in accordance with the range ($r_2$) to simulated target 18 is fed to landing coupler 22. Landing coupler 22 also receives elevation compensating signals and azimuth compensating signals as well as the azimuth error signal, $\beta_{az}$, and the elevation error signal, $\epsilon_{el}$. The details of landing coupler 22 are illustrated in FIGS. 8 and 9 and will be described in conjunction therewith.

The output of landing coupler 22 is fed to control device 29 which may comprise an indicator which the pilot may use in guiding the plane to zero out the error signals indicated thereon or may comprise an autopilot which automatically guides the plane so as to null the error signals.

Referring now to FIG. 7, the general aspects of a range tracking unit which may be utilized in the device of the invention are illustrated. The video detected sum signal, $E_s$, from video detector 90 is fed to an electronic error generator 95 where bipolar $E_s$ video for error determination is generated. Electronic error generator 95 also receives as an input signal a range gate, which is a narrow square wave appearing at a time after the trigger signal corresponding to the range to simulated target 18.

In electronic error generator 95, a D.-C. voltage is generated in accordance with the difference of the time of arrival of the video sum signal, $E_s$, and the range gate, $r_2$, fed thereto. This D.-C. signal, representing the correction that must be made in the time of arrival of the range gate to make for coincidence between the range gate and the target being tracked is fed to the integrator circuits 98. The signal is double integrated in the integrator circuits 98 with lead stabilization and summed with the voltage at the arm of potentiometer 100 to produce a voltage indicative of the range, $r_2$, to the target being tracked.

A D.-C. reference source 102 is connected across the ends of potentiometer 100. The arm of potentiometer 100 is controlled by knob 105. The operator in initiating automatic tracking rotates knob 105 to produce an overlapping between the range gate and the target signals to be tracked, as viewed on his radar indicator. This is indicative of coincidence in the time of arrival of the target signals and the range gate.

The output of integrator circuits 98, which is a D.-C. voltage indicative of the range of the target onto which the radar is locked, is fed to time modulator 110. Time modulator 110 also receives a pretrigger signal which, as already indicated, is generated at a time before the normal radar system trigger corresponding to the difference in range between the two simulated targets. Time modulator 110 generates an output pulse at a time following the pretrigger signal corresponding to the range voltage fed thereto from the integrator circuits 98. Time modulator 110 may comprise a sweep generator which is triggered by the pretrigger signal and a coincidence detector which will generate an output pulse when the sweep voltage generated by the sweep generator is coincidental in magnitude with the range voltage fed from the integrator circuits 98. The output of time modulator 110 is a range gate signal, $r_1$, which is generated at a time following the system trigger signal which corresponds to the range of simulated target 17. The range gate signal, $r_1$, is fed to delay line 112 where it is appropriately delayed to produce the range gate, $r_2$, corresponding to the range of simulated target 18 onto which the system is locked.

The range tracking circuitry illustrated in FIG. 7 is illustrative of one means for generating the range gates $r_1$ and $r_2$ and a range signal indicative of the range of one of the simulated targets. Any other circuitry which will generate these signals from the pretrigger and video sum channel signals may be utilized.

Referring now to FIG. 8, a block diagram of the elevation channel of a landing coupler which may be utilized with the device of this invention is illustrated. The elevation error signals, $\epsilon_{el}$, are fed to modulator 115 where they are impressed upon an A.-C. carrier. The modulated signals are fed from modulator 115 to gain scheduler 117. In gain scheduler 117, the amplitude of the signals are controlled as a function of the range $r_2$ to simulated target 18. Gain scheduler 117 may comprise a servo-controlled potentiometer whose arm position is controlled in response to the amplitude of the input range signal or it may comprise an electronic amplifier whose gain is varied in accordance with the range input signal. Gain scheduling is necessary to compensate for wide variations in the effective gains (relative to aircraft motion) of the output of the radar unit during the course of the approach because of the approach geometry and the polar nature of the radar measurements. The output of gain scheduler 117 is appropriately amplified in amplifier 118 and fed on to summing amplifier 120.

Stability augmentation signals are also provided in the form of washed-out pitch rate and washed-out stick position signals. The washed-out pitch rate signals are fed to demodulator 122 and then to a shaper 124 where they are appropriately shaped by technique well known in the art and finally impressed upon an A.-C. carrier in modulator 125 and fed to summing amplifier 120.

The stick position signals are similarly shaped in shaper 127 modulated onto a carrier in modulator 128 and then fed to summing amplifier 120.

The elevation error signals and the elevation stability augmentation signals are summed in summing amplifier 120 and fed to demodulator 130 where the modulation envelope is extracted. The output of demodulator 130 is a control signal which may be used to effectively control the aircraft vertically in effecting a landing. This signal may be fed by means of switch 135 either to a display indicator 140 or to an autopilot 141. In display indicator 140 an error dot display is provided, the pilot flying the aircraft to center this dot on his display indicator. With the signal fed to autopilot 141, the autopilot will automatically fly the aircraft to zero out the elevation error signal.

Referring now to FIG. 9, a block diagram of the azimuth channel of a landing coupler which may be used in the device of the invention is illustrated. The azimuth error signals, $\beta_{az}$, are fed to modulator 145 where they are impressed on an A.-C. carrier and then fed to gain scheduler 147 where the gain is varied as a function of the range $r_2$, similarly as for the elevation channel. The signals from gain scheduler 147 are amplified in amplifier 148 and then fed to summing amplifier 150. Azimuth stability augmentation system signals for yaw rate and roll rate are amplified in amplifier 152 and then fed to demodulator 153 where the modulation envelope is extracted. The output of demodulator 153 is shaped in shaper 155 and then impressed upon an A.-C. carrier in modulator 157. Stability augmentation signals in accordance with the rudder position and the aileron stick position are shaped respectively in shapers 159 and 160 and then impressed upon A.-C. carriers in associated modulators 162 and 163.

All of the azimuth stability augmentation signals are summed with the azimuth error signal in summing amplifier 150. The summed output of amplifier 150 is demodulated in demodulator 165. The output of demodulator 165 which represents the control signals necessary to guide the aircraft in azimuth may be alternatively fed either to display indicator 140 or autopilot 151 by means of switch 170. For manual flight control operation, the output of demodulator 165 is fed to display indicator 140 and the pilot flies the aircraft to keep the steering dot centered on the display, while for automatic control the output of demodulator 165 is fed through switch 170 to the autopilot 141 which automatically controls the aircraft.

It is to be noted that the landing couplers shown in FIGS. 8 and 9 are only illustrative of one technique which may be employed in utilizing the elevation and azimuth error signals to effect a landing. Landing and control systems using information inputs similar in basic nature to the elevation error and azimuth error signals made available in the device of applicants' invention may be adapted to operate in conjunction therewith by means of techniques within the realm of one ordinarily skilled in the art.

The device of this invention thus provides a landing system which may be used in conjunction with a tracking radar installed in the aircraft and a pair of simulated targets on the landing strip without a requirement for complicated ground based equipment.

Although the invention has been described and illustrated in detail, it is to be clearly understood that the same is by way of illustration and example only and is not to be taken by way of limitation, the spirit and scope of this invention being limited only by the terms of the appended claims.

We claim:

1. A system for providing information for control of a vehicle comprising first and second mutually spaced targets having preselected positions, monopulse radar means adapted to be carried by said vehicle for generating signals indicative of the range to at least one of said targets and the azimuth and elevation angles subtended between said targets, and means responsive to said signal generating means for providing an indication of the position of the vehicle with respect to at least one of said targets.

2. A method for determining the position of a vehicle relative to a pair of targets, said vehicle having a monopulse tracking radar and control device mounted therein comprising the steps of locking said radar on in azimuth and elevation to one of said targets, deriving signals in said monopulse radar indicative of the azimuth and elevation angles subtended between said targets, and feeding the derived signals to said control device.

3. In a vehicle control system, first and second mutually spaced radar targets having preselected positions, radar means adapted to be carried by said vehicle for generating signals indicative of the range of at least one of said targets and both the azimuth and elevation angles subtended between said targets, computer means responsive to the output of said radar means for generating vehicle control signals, and control means responsive to the output of said computer means for controlling the position of said vehicle relative to said targets.

4. The device as recited in claim 3 wherein said radar means comprises a radar receiver having azimuth and elevation error channels and a sum channel, a range tracking unit, a landing coupler and a delay line, the output of said sum channel being fed to said range tracking unit, said range tracking unit having a D.-C. output in accordance with range to one of said targets and a range gate output in accordance with range to the other of said targets, said D.-C. output in accordance with range being fed to said landing coupler, said range gate output being simultaneously fed to said azimuth and elevation error channels and said delay line, the output of said delay line being fed to said azimuth and elevation error channels, the outputs of said azimuth and elevation error channels being fed to said landing coupler.

5. The device as recited in claim 4 wherein said azimuth and elevation channels each having gating means inserted therein, said range gate output and the output of said delay line being fed to gate said gating means.

6. An aircraft landing system for effecting a landing on a runway comprising first and second simulated targets mounted at predetermined positions on said runway, means mounted in said aircraft for generating separate signals in accordance respectively with the azimuth and elevation angles subtended at said aircraft between said targets and the range to one of said targets, and means responsive to said signal in accordance with range and said signals in accordance with azimuth and elevation angles for producing a control signal for guiding the landing of said aircraft.

7. An aircraft landing system for effecting a landing on a runway with a predetermined glide path comprising first and second simulated targets mounted at predetermined positions on said runway, means mounted in said aircraft for generating separate signals in accordance with the azimuth angle subtended at said aircraft between said targets, the elevation angle subtended at said aircraft between said targets, and the range to one of said targets, means for generating a signal in accordance with said predetermined glide path as a function of range to said one of said targets, means for subtracting said signal in accordance with elevation angle from said signal in accordance with predetermined glide path to produce an elevation error signal, and means responsive to said elevation error signal, said signal in accordance with range, and said signal in accordance with azimuth angle for producing a control signal for guiding the landing of said aircraft.

8. In a system for controlling the landing of an aircraft on an aircraft runway, first and second simulated radar targets mounted on said runway, a radar mounted in said aircraft, said radar having sum, azimuth error, and elevation error channels, a range tracking unit connected to receive the video output of said sum channel, said range tracking unit having a first range gate output signal indicative of the range of said first simulated target and a range signal indicative of the range of said second simulated target, delay means responsive to the range gate output of said range tracking unit for producing a second range gate signal indicative of the range of said second simulated target, said first and second range gate signals being fed to said azimuth and elevation error channels, means for generating a signal indicative of predetermined desired aircraft guide path as a function of the range to one of said targets, the output of said generating means being fed to said elevation error channel, a landing coupler, the outputs of said elevation and azimuth error channels and the range signal output of said tracking unit being fed to said landing coupler, and a control device responsively connected to said landing coupler.

9. In a system for controlling the landing of an aircraft on an aircraft runway, first and second simulated radar targets mounted on said runway, a radar mounted in said aircraft, said radar having sum, azimuth error, and elevation error channels, a range tracking unit connected to receive the video output of said sum channel, said range tracking unit having a first range gate output signal indicative of the range of said first simulated target and a range signal indicative of the range of said second simulated target, delay means responsive to the range gate output of said range tracking unit for producing a second range gate signal indicative of the range of said second simulated target, first gating means inserted in said azimuth channel for gating signals detected in said azimuth channel indicative of the azimuth angle of the radar antenna boresight of said first simulated target, second gating means inserted in said elevation channel for gating signals detected in said elevation channel indicative of the elevation angle subtended between said first and second targets, said first and second range gate signals being fed to said first and second gating means respectively, means for generating a signal indicative of predetermined desired aircraft glide path as a function of the range to one of said targets, the output of said generating means being fed to said elevation error channel, a landing coupler, the outputs of said elevation and azimuth error channels and said range signal being fed to said landing coupler, and a control device responsively connected to said landing coupler.

10. In a landing system for effecting a landing on a predetermined runway, a pair of simulated targets mounted on said runway in a line with the desired aircraft ground track, a tracking radar system having a range tracking unit, said radar system further having sum, elevation error, and azimuth error channels, said radar system being locked onto one of said targets, the output of said sum channel being fed to said range tracking unit, said range tracking unit having a D.-C. output indicative of range to said one target onto which said system is locked and a range gate output indicative of range to the other of said targets, means for delaying said range gate output in accordance with the distance between said targets, the range gate outputs of range tracking unit and said delay means being fed to said elevation error and azimuth error channels, means for generating a signal programmed in accordance with the desired elevation angle of the other of said targets as a function of range to said one of said targets, the range output of said tracking unit being fed to said generating means, and the output of said generating means fed to said elevation error channel, a landing coupler, the range output of said range tracking unit, the elevation error output of said elevation error channel, and the azimuth error output of said azimuth error channel being fed to said landing coupler, and a control device connected to receive the output of said landing coupler.

11. The device as recited in claim 10 wherein said control device is an autopilot.

12. The device as recited in claim 10 wherein said landing coupler comprises separate azimuth and elevation control channels connected to receive said azimuth and elevation error outputs respectively, each of said channels having gain scheduling means included therein for controlling the channel gain as a predetermined function of the range to said one of said targets, the range output of said range tracking unit being connected to each of said schedulers.

References Cited by the Examiner
UNITED STATES PATENTS

| | | | |
|---|---|---|---|
| 2,379,363 | 6/45 | Lear | 343—117 |
| 2,543,065 | 2/51 | Salinger | 343—5 |
| 2,821,704 | 1/58 | O'Day | 343—6 |
| 2,933,980 | 4/60 | Moore et al. | 89—1 |
| 3,101,471 | 8/63 | Stavis | 343—108 |

CHESTER L. JUSTUS, *Primary Examiner.*

FREDERICK M. STRADER, KATHLEEN H. CLAFFY, *Examiners.*